Dec. 6, 1955 E. H. SPRINGMEIER 2,725,719
MASTER HYDRAULIC CYLINDER CONSTRUCTION AND METHOD
Filed Aug. 16, 1948 2 Sheets-Sheet 2
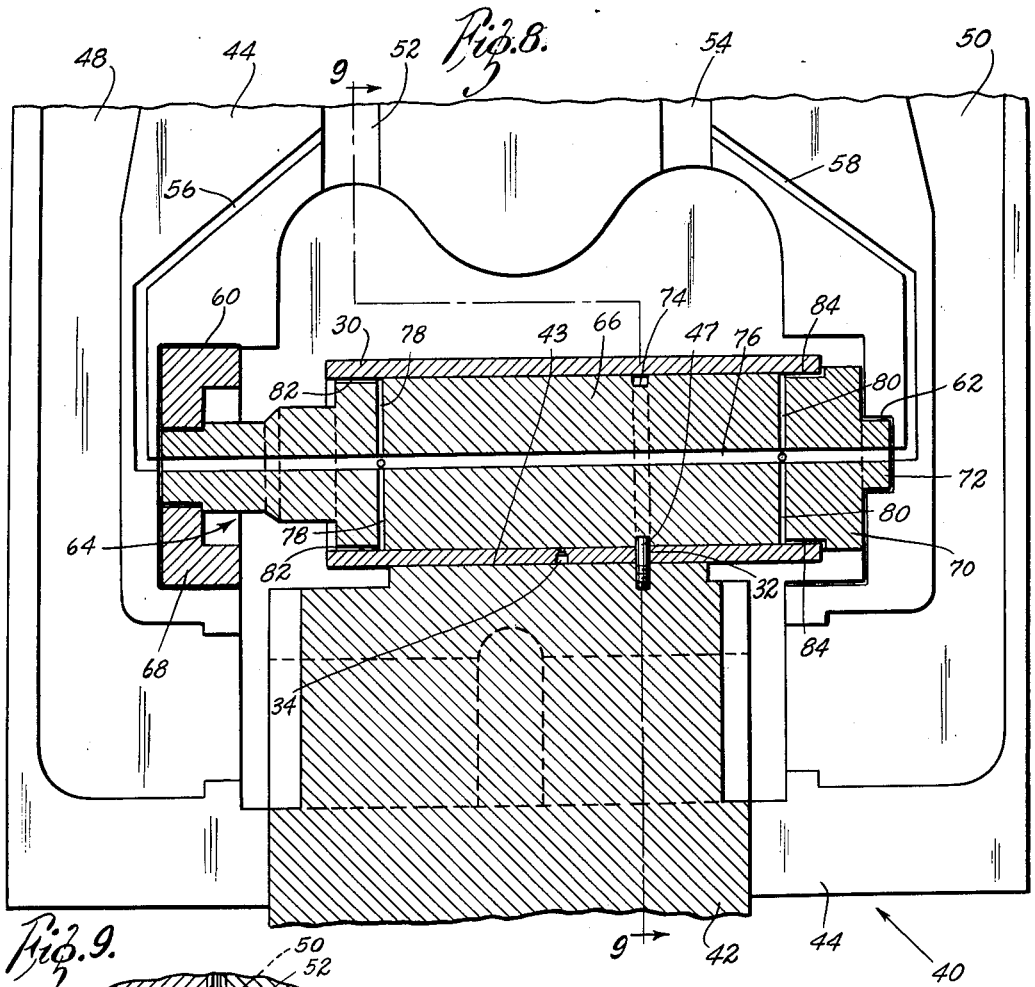
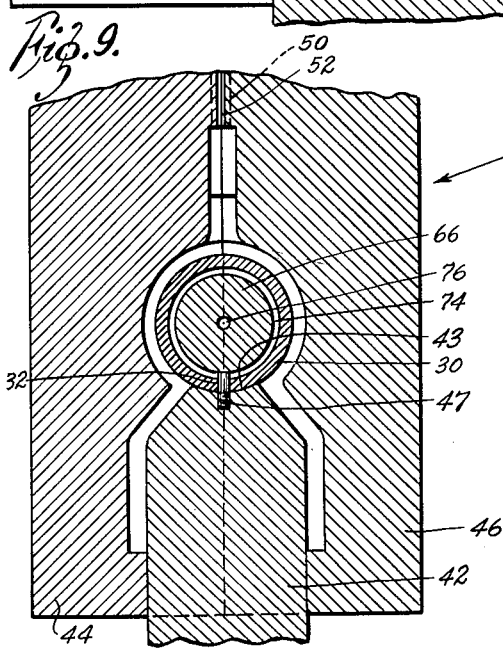
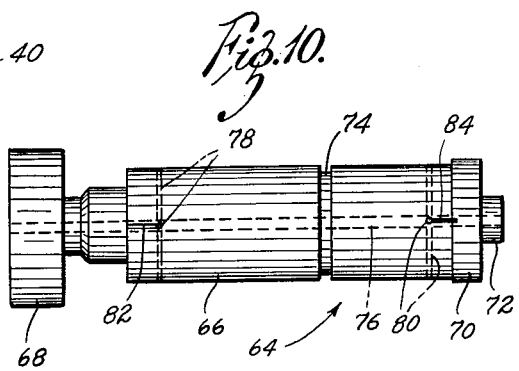
INVENTOR:
EDWARD H. SPRINGMEIER,
BY Rogers + Ezell,
ATTORNEYS.

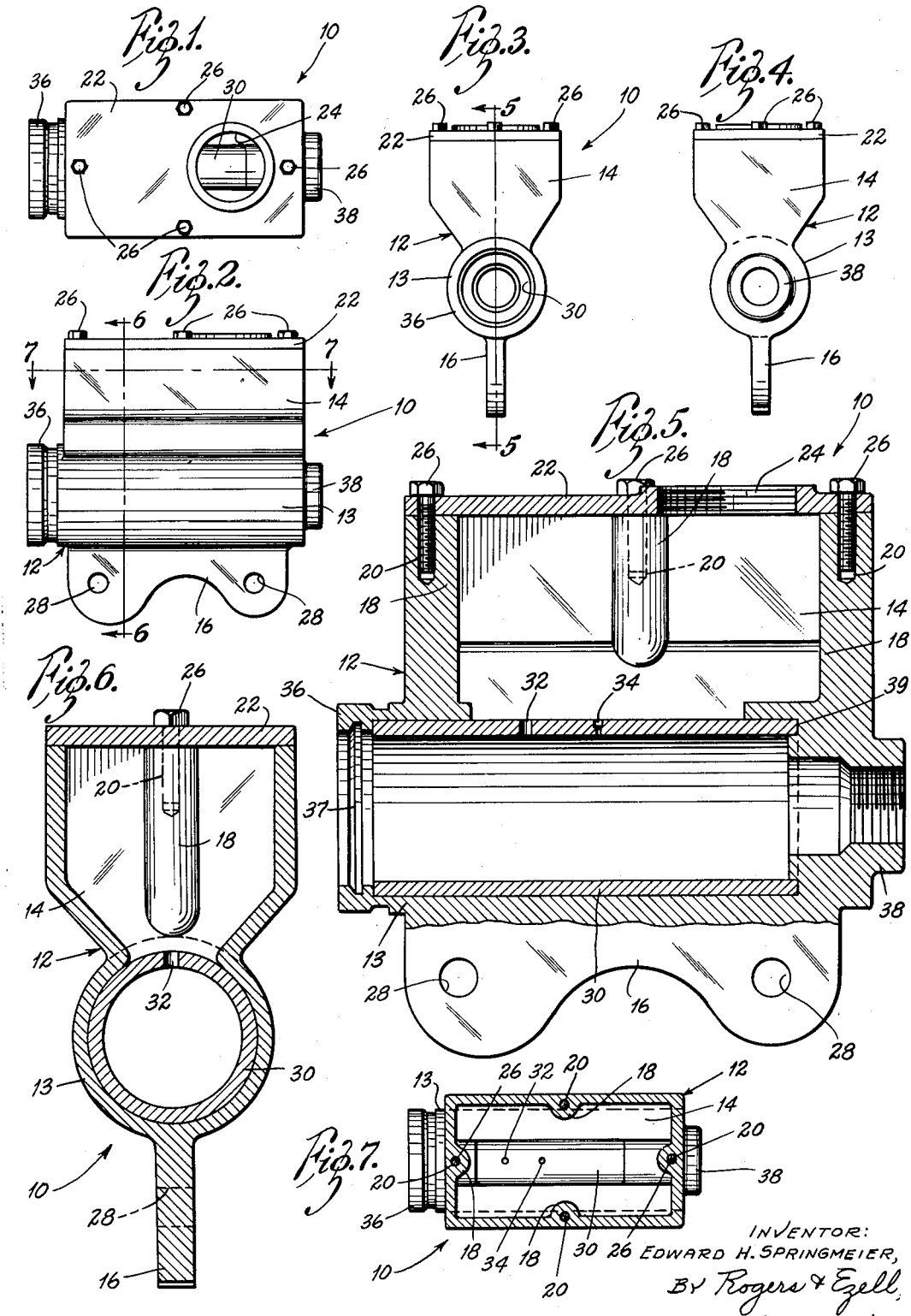
Dec. 6, 1955  E. H. SPRINGMEIER  2,725,719
MASTER HYDRAULIC CYLINDER CONSTRUCTION AND METHOD
Filed Aug. 16, 1948  2 Sheets-Sheet 1
INVENTOR:
EDWARD H. SPRINGMEIER,
BY Rogers & Ezell,
ATTORNEYS.

United States Patent Office 2,725,719
Patented Dec. 6, 1955

2,725,719

MASTER HYDRAULIC CYLINDER CONSTRUCTION AND METHOD

Edward H. Springmeier, Jennings, Mo., assignor of one-sixth to Eugene G. Tighe, St. Louis, Mo.

Application August 16, 1948, Serial No. 44,526

10 Claims. (Cl. 60—54.6)

The present invention relates generally to the hydraulic brake art, and more particularly to a novel master cylinder construction and a novel method of forming the same by casting metal around a preformed, machined cylinder.

Heretofore master cylinders for use with hydraulic brake systems for motor vehicles and the like have been cast of semi-steel in sand molds, the usual practice being to core out the reservoir and the cylinder portions and then to machine the interior surface of the cylinder. This type of construction has numerous disadvantages, one of which is that the interior of the cylinder wears down within a relatively short time, thereby causing a gap between the piston-cup and the cylinder wall. Also, it is difficult to cast the metal without having pits on the interior surface of the cylinder after it is machined, and it has also been found that the brake fluid causes the pits to become enlarged, which in turn causes malfunctioning of the cylinder. The pitting of the metal is also the reason why it is impractical to re-bore the cylinders and use a larger size piston-cup. Another difficulty with this type of casting is that, after the master cylinder has been installed, the scale and sand particles from the inside walls of the reservoir become lodged in the passageways between the reservoir and the cylinder, thereby obstructing the passage of the fluid and causing malfunctioning of the system.

Master cylinders have also been made of a unitary aluminum alloy casting, but this construction has not proven entirely satisfactory because of the difficulty of hardening the interior surface of the cylinder.

It is a primary object of the present invention, therefore, to provide a novel master cylinder construction which has a cylinder with a hard, long wearing inner surface.

Another object is to provide a master cylinder construction which has a cylinder which is free from pits.

Another object is to provide a master cylinder construction in which the cylinder portion is separately formed and machined.

Another object is to provide a master cylinder construction in which obstruction of the passageways between the reservoir and the cylinder by sand and scale particles falling from the inside walls of the reservoir is completely eliminated.

Another object is to provide a master cylinder construction which is economical to manufacture.

Another object is to provide a method and equipment for casting a reservoir in sealing engagement with a preformed cylinder.

Another object is to provide a method and equipment for forming a sound casting around a preformed cylinder without distorting the latter.

Further objects and advantages of the present invention will be apparent from the following description, reference being had to the accompanying drawings wherein a preferred embodiment of the invention is shown, in which:

Fig. 1 is a top plan view of a master cylinder constructed in accordance with the teachings of the present invention with the removable cover in place;

Fig. 2 is a side elevational view of the same master cylinder;

Fig. 3 is an end elevational view from the left end of Fig. 2;

Fig. 4 is an end elevational view from the right end of Fig. 2;

Fig. 5 is an enlarged vertical central longitudinal sectional view taken on the line 5—5 in Fig. 3;

Fig. 6 is an enlarged vertical transverse sectional view, taken on the line 6—6 of Fig. 2;

Fig. 7 is a horizontal sectional view, taken on the line 7—7 in Fig. 2;

Fig. 8 is an enlarged interior side elevational view of one section of the mold showing an in place assembly of a reservoir core, preformed cylinder and mandrel in section;

Fig. 9 is a reduced fragmentary vertical transverse sectional view of the mold and contained elements, taken on the line 9—9 in Fig. 8; and Fig. 10 is a reduced top plan view of the mandrel shown in Fig. 8.

Referring to the drawings more particularly by reference numerals, specifically Figs. 1 to 7, 10 indicates generally a master cylinder constructed in accordance with the teachings of the present invention, which includes a casing 12 comprising a cylindrical portion 13 on which is mounted a integral reservoir 14. A flange portion 16 depends from the bottom of the cylindrical portion 13. Lugs 18 are formed in the walls of the reservoir 14 with threaded holes 20 formed therein. A cover 22 with a threaded hole 24 formed near one end is removably secured to the top of the reservoir 14 by bolts 26. Holes 28 are formed in the flanged portion 16.

A machined cylinder 30 with longitudinally aligned holes 32 and 34 formed in the uppermost surface thereof is disposed within the cylindrical portion 13 in sealing engagement therewith.

At one end the cylindrical portion 13 is formed as an annular head 36 having an internal diameter slightly greater than the internal diameter of the cylinder 30. The head 36 has an internal annular groove 37. At its other end, the cylindrical portion 13 has an internally threaded annular head 38 having an internal diameter smaller than the internal diameter of the portion 13. Both of said heads 36 and 38 are concentric with the cylinder 30. At the head 38, the end of the cylinder 30 is embedded in an annular groove 39.

Referring to Figs. 8 to 10, 40 indicates generally a metallic mold of the split type which includes a stationary metal core 42 for forming the interior of the reservoir 14, and movable left- and right-hand side members 44 and 46 which form the exterior surfaces of the casing 12. The top surface 43 of the core 42 is concave, as shown in Fig. 9.

A pin 47 having a diameter slightly smaller than the diameter of the hole 32 in the cylinder 30 extends vertically upward from the top surface 43 of the stationary core 42.

The side members 44 and 46, in addition to having the exterior shape of the casing 12 formed therein, also include pouring gates 48 and 50, risers 52 and 54 and vent holes 56 and 58 leading into the risers, the function of and the need for the latter being described below. Semi-circular shaped recesses 60 and 62 are formed in the ends of the side members 44 and 46, the centers of the recesses coinciding with the center line of the cylinder 30.

A steel mandrel 64, as shown in Fig. 10, is provided for insertion in the cylinder 30. The mandrel 64 includes a body member 66 and a cap 68 which is adapted to be slidably fitted on one end thereof. The body member 66 has a shoulder portion 70 and a rod-like projection 72 formed on the end thereof opposite to the cap 68, the outside diameter of the projection 72 being slightly smaller than the inside diameter of the recess 62. The outside diameter of the main portion of the body 66 is approximately one/one-thousandth of an inch smaller than the inside diameter of the cylinder 30 so that it must be forced therein. The outside diameter of the cap 68 is slightly smaller than the inside diameter of the recess 60 in the side members 44 and 46. An annular groove 74 of a width slightly larger than the diameter of the pin 47 is formed in the periphery of the body member 66. A longitudinal passage 76 is formed in the center of the body member 66 and radial passages 78 and 80 lead outwardly from the passage 76 to the outer surface. Longitudinal grooves 82 and 84 are formed on the outer surface of the body member 66 and extend from the ends of the passages 78 and 80, outwardly to the ends of the mandrel 64.

To form a casting as the casing 12 around the preformed cylinder 30, the soft steel mandrel 64 with the cap 68 removed is first inserted in the cylinder 30 until the shoulder 70 abuts the end of the cylinder, thereby aligning the hole 32 with the groove 74. The body member 66 is made of soft steel so that it will not score the inside of the cylinder 30 during this operation.

The cap 68 is then fitted on the end of the body member 66 and the mandrel and cylinder preheated to within the neighborhood of 800 to 900 degrees Fahrenheit. It was found advantageous to preheat these parts in order to obviate excess chilling of the molten metal.

After the cylinder 30 and mandrel 64 are preheated to the proper temperature, the members 44 and 46 are moved outwardly away from the stationary metal core 42 and the assembled mandrel and cylinder placed on top of the core 42 with the pin 47 extending through the hole 32 and into engagement with the groove 74. The mandrel 64 and cylinder 30 are supported in proper position atop the core 42 by the concave top surface 43 of the core 42 and the pin 47, the latter positioning the cylinder longitudinally within the mold.

The side members 44 and 46 are then brought together and locked, in which position the cap 68 and projection 72 engage the recesses 60 and 62, respectively.

The molten metal, which is preferably an aluminum alloy and which has been heated to the proper temperature (approximately 1500 to 1600 degrees Fahrenheit), is then poured into the gates 48 and 50 and permitted to descend by force of gravity into the body of the mold and thence up into the risers 52 and 54. If desired, the molten metal can be injected under pressure, but it has been found that satisfactory results can be obtained without resorting to this additional expense.

It was found that the risers alone were not sufficient to permit gases to escape, and that, as the molten metal flowed around the ends of the cylinder 30, gas pockets would be formed which would produce a faulty casting. This was obviated in the present invention by forming the longitudinal and radial passages in the body member 66 of the mandrel, which lead to the vent holes 56 and 58. With this arrangement, any gas which is trapped adjacent the right-hand end of the cylinder 30, for example, can escape through the passages 84, 80 and 76 and thence out through the vent hole 58. The passages 82 and 84 and the vent holes 56 and 58 are large enough to permit the gas to escape but are too small to permit an appreciable amount of metal to enter therein.

After the molten metal has solidified, the side members 44 and 46 are moved apart, and the casing 12 and mandrel 64 are removed from the core 42 and allowed to cool. The inside of the reservoir 14 formed by the metal core 42 is smooth so that there is no possibility of scale falling off and lodging in the passages in the cylinder wall.

When the molten metal solidifies around the cylinder 30, it bonds itself thereto, thereby forming an airtight seal, and as it cools it also shrinks, thus increasing the bond between the two metals.

It was found that without reenforcing the cylinder 30 against the compressive forces set up by the shrinking aluminum alloy as it cooled, the cylinder 30 would be slightly deformed. Therefore, the mandrel 64 serves two purposes. It assists in holding the cylinder 30 in place during the pouring operation, and it also substantially prevents it from being deformed by the contracting aluminum alloy as the latter cools.

Excellent results have also been obtained by reducing the height of the reservoir core 42 so that the mandrel 64 is supported by only the side members 44 and 46, thereby permitting the molten metal to flow completely around the cylinder 30. In this method, the force exerted by the shrinking metal as it cools is uniform around the cylinder, thus obviating any deformation whatsoever.

After the casing 12 has cooled, the cap 68 is removed from the body member 66 and the latter pressed from the casting. The gates and risers are then severed from the casting and the scrap returned to be re-melted.

As the metal around the outside of the cylinder 30 contracts to form a closer bond therewith, the metal on the inside of the cylinder forming the inner wall of the groove 39 shrinks away from the cylinder wall. Although this is not too serious a factor, it does impair the seal between the two metals so that it has been found advantageous to force the inner wall of the groove 39 back into position contiguous with the inner surface of the cylinder 30. This is accomplished by first placing the casing 12 in a jig with the cylinder 30 in a vertical position and the head 36 at the top. A staking tool having an end which is somewhat frusto-conical in shape with a shoulder formed thereon is then inserted downwardly through the cylinder 30 into the head 38, in which position the sides on the end of the tool bear against the inner surface of the head 38 adjacent the groove 39. Pressure is then exerted on the staking tool, thereby forcing the inner wall of the groove 39 back into place against the inner surface of the cylinder 30.

In this same operation, the shoulder on the end of the staking tool forms a valve seat in the metal within the cylinder 30 adjacent the groove 39, and at the same time compresses the metal in the head portion 38 thereby increasing its tensile strength.

Because the cylinder 30 is formed and machined before being placed in the mold 40, it can be made with practically any desired hardness, and, if desired, can be made to outlast the equipment on which it is installed. Also, the hardness of the cylinder 30 is not impaired by being heated during the casting operation because the pouring temperature of the aluminum alloy is not high enough to affect its crystalline structure.

Thus it is apparent that there has been provided a master cylinder construction and method which produces a piston receiving cylinder, the hardness of which is practically unlimited, and one which can be produced at a fraction of the cost of the known constructions.

It is to be understood that the foregoing description and the accompanying drawings have been given only by way of illustration and example, and that changes and alterations in the present disclosure, which will be readily apparent to one skilled in the art, are contemplated as within the scope of the present invention which is limited only by the claims which follow.

What is claimed is:

1. A fluid pressure cylinder of the type described, comprising a preformed cylinder having an end edge and outer and inner surfaces; and a casing disposed about the outer surface of said cylinder and bound in contact therewith; and means sealing the end of the cylinder and the casing together, comprising a unitary portion of the casing extending around one end edge of the cylinder and inside and in contact with the inner surface adjacent said end.

2. A fluid pressure cylinder of the type described, comprising a preformed cylinder having an end edge and outer and inner surfaces; and a casing disposed about the outer surface of said cylinder and bound in contact therewith; and means sealing the end of the cylinder and the casing together, comprising a unitary portion of the casing extending around one end edge of the cylinder and inside and in contact with the inner surface adjacent said end, the casing substantially surrounding the entire outside of the cylinder, and having a fluid container incorporated in the casing outside the cylinder.

3. In a fluid pressure device, a preformed cylinder having an outer surface, an inner surface, and end edges; a casing around the cylinder comprising a casting cast around the outside of the cylinder, the casting extending over one end edge of the cylinder and inside the cylinder adjacent said edge, entirely around the cylinder, the cast casing being bound to the cylinder at said end and constituting a fluid tight seal between the end of the cylinder and the casing at said end.

4. In a fluid pressure device, a preformed cylinder having an outer surface, an inner surface, and end edges; a casing around the cylinder comprising a casting cast around the outside of the cylinder, the casting extending over one end edge of the cylinder and inside the cylinder adjacent said edge, entirely around the cylinder, the cast casing being bound to the cylinder at said end and constituting a fluid tight seal between the end of the cylinder and the casing at said end, the casing including a fluid reservoir, and fluid conducting means connecting the reservoir and the interior of the cylinder, the reservoir being held from communication with the inside of the end of the cylinder by the seal.

5. In a fluid pressure device, a preformed cylinder having an outer surface, an inner surface, and end edges; a casing around the cylinder comprising a casting cast around the outside of the cylinder, the casting extending over one end edge of the cylinder and inside the cylinder adjacent said edge, entirely around the cylinder, the cast casing being bound to the cylinder at said end and constituting a fluid tight seal between the end of the cylinder and the casing at said end, the portion of the casing inside the cylinder being in intimate contact with the inside surface of the cylinder.

6. In a method of casting a casing around a preformed cylinder without distortion of the cylinder: the steps of filling the inside of the cylinder with a removable, substantially incompressible filler means, except for leaving a portion of one end of the cylinder projecting beyond the filler, inserting the cylinder thus filled into a mold, maintaining the projecting end of the cylinder accessible in the mold to the cast metal, and casting a metal outside and around inside the projecting end of the cylinder that shrinks upon cooling, cooling the casting onto the outside of the cylinder while the filler means prevents the crushing forces of the cooling metal from distorting the cylinder, and removing the filler means after the casting has so cooled, and then pressing the casting and cylinder together at contiguous cylindrical surfaces to form a seal between them.

7. The method of claim 6, wherein forming the seal includes, forcing the portion of the cast metal thus on the inside of the cylinder against the inside surface of the cylinder.

8. In a method of making a hydraulic cylinder: the steps of filling the inside of a preformed metal cylinder with a removable, substantially incompressible filler means; enclosing the cylinder and filler means in a mold; casting metal around the cylinder, which metal applies compressive forces on the cylinder when it cools but which is subject to separation from the cylinder, when finally cold, but could permit leaking when hydraulic fluid is within the cylinder; leaving the parts within the mold until cool, then removing them from the mold and withdrawing the filler means from the cylinder; and finally causing sealing pressure between the cold cast metal and the cylinder at an appropriate location to prevent leakage of the hydraulic fluid when the cylinder is in use by applying a tool to compress the cast metal and cylinder into contact around the cylinder.

9. A hydraulic cylinder such as a master cylinder for hydraulic brake apparatus, comprising a cylindrical sleeve for receiving a hydraulic piston, a casting about the sleeve forming a fluid reservoir to one side of the cylindrical sleeve, a passage through the wall of the sleeve connecting the reservoir and the interior of the sleeve, and means sealing a cylindrical surface of the sleeve and a cylindrical surface of the casting together in permanent compressive sealing attachment to prevent leakage along their contiguous surfaces.

10. In a method of making a hydraulic cylinder: the steps of filling the inside of a preformed metal cylinder with a removable, substantially incompressible filler means; enclosing the cylinder and filler means in a mold; casting metal around the cylinder, which metal applies compressive forces on the cylinder when it cools but which is subject to separation from the cylinder, when finally cold, that could permit leaking when hydraulic fluid is within the cylinder, and casting a hollow reservoir for hydraulic fluid adjacent the cylinder; leaving the parts within the mold until cool, then removing them from the mold and withdrawing the filler means from the cylinder; causing sealing pressure between the cold cast metal and the cylinder at an appropriate location to prevent leakage of the hydraulic fluid when the cylinder is in use; and providing a fluid passage through the cylinder to establish communication from the reservoir to the interior of the cylinder.

References Cited in the file of this patent

UNITED STATES PATENTS

| Number | Name | Date |
|---|---|---|
| 746,944 | Ford | Dec. 15, 1903 |
| 1,170,180 | O'Dowd | Feb. 1, 1916 |
| 1,477,640 | Fisher | Dec. 18, 1923 |
| 1,564,185 | Seem | Dec. 1, 1925 |
| 1,619,479 | Maupin | Mar. 1, 1927 |
| 1,701,297 | Custenborder | Feb. 5, 1929 |
| 1,732,515 | Hunter | Oct. 22, 1929 |
| 1,738,056 | Hunter | Dec. 3, 1929 |
| 2,085,015 | Engstrom | June 29, 1937 |
| 2,106,590 | Boegehold | Jan. 25, 1938 |
| 2,119,056 | Peterson | May 31, 1938 |
| 2,156,205 | Swift | Apr. 25, 1939 |
| 2,208,575 | Frank | July 23, 1940 |
| 2,331,554 | Irgens | Oct. 12, 1943 |
| 2,435,837 | Larson | Feb. 10, 1948 |
| 2,473,168 | Milster | June 14, 1949 |
| 2,531,705 | Schultz | Nov. 28, 1950 |

FOREIGN PATENTS

| Number | Country | Date |
|---|---|---|
| 386,302 | Great Britain | Apr. 9, 1931 |
| 755,377 | France | Sept. 4, 1933 |
| 793,061 | France | Nov. 11, 1939 |

OTHER REFERENCES

"Die Casting Practice," by Stern, 1930, McGraw-Hill Book Co., Inc., page 67.